US011048828B2

(12) United States Patent
Bitton et al.

(10) Patent No.: US 11,048,828 B2
(45) Date of Patent: Jun. 29, 2021

(54) MESSAGE SOURCE DETECTION IN A VEHICLE BUS SYSTEM

(71) Applicant: ENIGMATOS LTD., Yavne (IL)

(72) Inventors: Charly Bitton, Pardes Hana (IL); Alexander Fok, Rehovot (IL); Eyal Kamir, Ganei Tikva (IL); Yoni Malka, Aley Zahav (IL); Orit Fredkof, Rishon LeZion (IL); Liran Zwickl, Or Yehuda (IL); Meni Dali, Petah Tikva (IL); Uriel Friedman, Aley Zahav (IL)

(73) Assignee: ENIGMATOS LTD., Yavne (IL)

( * ) Notice: Subject to any disclaimer, the term of this patent is extended or adjusted under 35 U.S.C. 154(b) by 0 days.

(21) Appl. No.: 16/614,452

(22) PCT Filed: May 14, 2019

(86) PCT No.: PCT/IL2019/050544
§ 371 (c)(1),
(2) Date: Nov. 18, 2019

(87) PCT Pub. No.: WO2020/021525
PCT Pub. Date: Jan. 30, 2020

(65) Prior Publication Data
US 2020/0394341 A1 Dec. 17, 2020

Related U.S. Application Data

(60) Provisional application No. 62/702,371, filed on Jul. 24, 2018.

(51) Int. Cl.
*G06F 21/85* (2013.01)
*G06N 20/00* (2019.01)
(Continued)

(52) U.S. Cl.
CPC .............. *G06F 21/85* (2013.01); *G06F 21/64* (2013.01); *G06N 20/00* (2019.01);
(Continued)

(58) Field of Classification Search
CPC ..... H04L 12/40104; H04L 2012/40215; H04L 2012/40273; G06F 21/64; G06F 21/85; G06N 20/00
See application file for complete search history.

(56) References Cited

U.S. PATENT DOCUMENTS 10,355,891 B2 * 7/2019 Juliato ............... H04L 25/4917
2015/0020152 A1   1/2015 Litichever et al.
(Continued)

FOREIGN PATENT DOCUMENTS

WO   20160115280 A1   7/2016
WO    2018104929 A1   6/2018

OTHER PUBLICATIONS

W. Choi et al. Identifying ECUs Using Inimitable Characteristics of Signals in Controller Area Networks. Jul. 2016. (Year: 2016).*
(Continued)

*Primary Examiner* — Robert B Leung
(74) *Attorney, Agent, or Firm* — Polsinelli PC

(57) ABSTRACT

Systems and methods for identifying the source of a message transmitted on the CAN bus of a vehicle, by creating a unique signature for each ECU. The system is further configured to detest malicious activities on a CAN bus system having a given physical configuration. The signature of an ECU is created based on the non-linearity of the CAN bus, by determining from at least one pulse of a read message a training-signature that includes a pair of sub-signatures: a rising-sub-signature of the rising response, and a falling-sub-signature of the falling response, as viewed by said message generating ECU. By reading a plurality of
(Continued)

messages from the ECUs operationally integrated on the CAN bus system, a classification & prediction methodology is used to create, for each message generating ECU, from the respective training-signatures, a unique ECU-signature.

30 Claims, 11 Drawing Sheets

(51) Int. Cl.
 *G06F 21/64* (2013.01)
 *H04L 12/40* (2006.01)
(52) U.S. Cl.
 CPC .......... *H04L 12/40104* (2013.01); *H04L 2012/40215* (2013.01); *H04L 2012/40273* (2013.01)

(56) References Cited

U.S. PATENT DOCUMENTS

| | | | |
|---|---|---|---|
| 2016/0149612 A1 | 5/2016 | Julson et al. | |
| 2016/0149930 A1 | 5/2016 | Casaburi et al. | |
| 2016/0308687 A1 | 10/2016 | Nickel | |
| 2018/0091550 A1 | 3/2018 | Cho et al. | |
| 2018/0270196 A1* | 9/2018 | Bathurst | H04L 63/14 |
| 2019/0028500 A1* | 1/2019 | Lee | H04L 63/1425 |
| 2019/0116045 A1* | 4/2019 | Markham | H04L 1/0061 |
| 2019/0238587 A1* | 8/2019 | Stevens | G06N 7/005 |
| 2019/0385057 A1* | 12/2019 | Litichever | G06N 3/08 |

OTHER PUBLICATIONS

O. Avatefipour et al. Linking Received Packet to the Transmitter Through Physical-Fingerprinting of Controller Area Network. WIFS' 2017, Dec. 4-7, 2017 (Year: 2017).*
P. C. Murvay et al. Source Identification Using Signal Characteristics in Controller Area Networks. IEEE Signal Processing Letters, vol. 21, No. 4, Apr. 2014 (Year: 2014).*
R. M. Gerdes et al. Physical-Layer Identification of Wired Ethernet Devices. IEEE Transactions on Information Forensics and Security, vol. 7, No. 4, Aug. 2012 (Year: 2012).*
International Search Report; PCT Application No. PCT/IL2019/050544; dated Aug. 18, 2019.
Written Opinion of PCT Application No. PCT/IL2019/050544; dated Aug. 18, 2019.
Publication Notice of WO20160115280; Retreived From www.espacenet.com on Nov. 14, 2019.
Muhammad Tayyab "Authenticating the Sender on Can Bus Using Inimitable Physical Characteristics of the Transmitter and Channel" Obtained on Oct. 7, 2019.
Quigley, C. et al., 'The Use of CAN Bus Message Electrical Signatures for Automotive Reverse Engineering', Mar. 12, 2018, retrieved from internet on Oct. 22, 2020; https://www.kvaser.com/use-can-bus-message-electrical-signatures-automotive-reverse-engineering.

* cited by examiner

MESSAGE SOURCE DETECTION IN A VEHICLE BUS SYSTEM

CROSS-REFERENCE TO RELATED APPLICATIONS

This application is a national stage entry of PCT/IL2019/050544 filed May 14, 2019 which claims convention priority from U.S. patent application 62/702,371 filed on Jul. 24, 2018, the contents each of which are hereby incorporated by reference in their entirety.

FIELD OF THE INVENTION

The present disclosure relates in general to means for identifying ECUs of a computerized system of a vehicle, such as a CAN bus system. More specifically, the disclosure relates to a system and method for identifying the source of message transmission on the CAN bus, by creating a unique signature for each ECU. The present disclosure further provide means for protecting the computerized system of the vehicle, such as a CAN bus system having a given physical configuration, from malicious activities.

BACKGROUND OF THE INVENTION

With $1.5 Trillion USD of annual turnover, the automotive industry is one of the most significant verticals. These days it witnesses a storm of change through a set of disruptive technologies driving the concept of connected and autonomous vehicles. This process requires a robust, foolproof and affordable cyber security solution, to allow adoption by the mass market. Moreover, many of today's 1.2 billion of cars on the roads already have connected components and are susceptible to cyber hacking. The vehicle is a complex network of computers on the move—today's vehicles have dozens (in many cases more than 50) of Electronic Control Units (ECUs) and more than 100M code lines. The connectivity between the car and external entities adds multiple attack surfaces, leaving the car and the passengers vulnerable. For example, today's cars are already designed to communicate with one another, with road signs, with traffic lights, with the manufacturer's server, and more. To allow all these operations, the necessity for a reliable vehicle's computerized system becomes extremely important.

The Controller Area Network (CAN bus) is the most common and robust vehicle bus standard designed to allow microcontrollers and devices to communicate with each other in applications without a host computer. Other protocols that are used on board of a vehicle are, for example, Can-FD, Flexray, and Automotive Ethernet Standards. The CAN bus is a message-based protocol, designed for multiplex electrical wiring within automobiles. The CAN bus allows communication between a plurality of Electronic Control Units (ECUs) also known as nodes. Two or more nodes are required on the CAN network to communicate. The complexity of the node can range from a simple I/O device up to an embedded computer with a CAN interface and sophisticated software. The node may also be a gateway allowing a general-purpose computer (such as a laptop) to communicate over a USB or Ethernet port to the devices on a CAN network. All the nodes of the CAN bus are typically connected to the bus through a two-wire connection. The wires are typically a twisted pair with a 120 Ω (nominal) characteristic impedance.

Each node in the CAN bus is able to send and receive messages, but not simultaneously. A CAN bus message consists primarily of a message identifier, and up to eight data bytes, a CRC, acknowledge slot (ACK) and other overhead slots that are a part of the message. The improved CAN FD extends the length of the data section to up to 64 bytes per frame. The message is transmitted serially onto the bus using a non-return-to-zero (NRZ) format and may be received by all nodes. The devices that are connected by a CAN network are typically sensors, actuators, and other control devices. These devices are connected to the bus through a host processor, a CAN controller, or a CAN transceiver (all referred to herein as "ECUs").

Under normal operation, each ECU reads the message identifier of the current CAN message, to thereby determine if it (namely the reading ECU) is an addressee of that message or not. However, none of the ECUs on the bus, reading that message, can determine which ECU sent that message. It should be noted that there are several situations, including cyber related situation, in which situation it is highly desired to identify the ECU that sent message. For example, if an unauthorized ECU is sending malicious messages on the CAN bus, it is highly desired to identify that ECU, in order to eliminate that threat.

A significant method by which a malicious actor may exploit the system is by acquiring control of an existing (valid) ECU, and may then send via this ECU malicious messages, while substituting within each of these messages a disguised message-ID (namely, a message-ID that is validly assigned to another ECU), to thereby pretend that these messages are validly sent via that another valid ECU.

Malicious messages may perform substantially any of the vehicle's activities, for example, causing acceleration of the vehicle, activation of the brakes, activation of the steering wheel, change of a gear state, turn ON or OFF the lights, and a variety of other actions.

In one prior art method, "Authenticating the Sender on CAN Bus using Inimitable Physical Characteristics of the Transmitter and Channel", published by the University of Michigan-Dearborn, 2018, Muhammad Tayyab suggests a technique for detecting the originator ECU of each CAN bus message, independent of the message content. With the assumption that the CAN bus is a linear system, Tayyab determines from the shape of the message-pulses of the impulse response of the specific "system", as viewed specifically by the respective ECU that originated the message. Different pulses having different shape characteristics, having distinguishing features, relate to different originating ECUs, respectively, as in fact, each specific ECU "sees" a different "system configuration" (which in fact includes all the other ECUs, excluding itself), respectively, and which different "system configurations" are echoed in the impulse response. Tayyab regards each impulse response of a message as a unique signature of the specific ECU that in fact transmitted the message. In this manner the message originator can be determined. However, the basic assumption of Tayyab, that the CAN bus is a linear system, is in fact incorrect, as the CAN bus system is a significantly non-linear bus system. That is, the shape of the rising portion of the impulse response of each pulse is significantly different from the shape of the falling portion of the impulse response of that pulse (see, for example, signal segment 50 in FIG. 2a, prior art).

In another prior art method, for example, in "Identifying ECUs Using Inimitable Characteristics of Signals in Controller Area Networks", by Wonsuk Choi et. al (https://arxiv.org/pdf/1607.00497.pdf), a collection of features from the pulse are generated, wherein such features may include amplitude, standard deviation, rise time etc. The pulse characteristics are then classified using machine learning methods such as classification-and prediction methods. Such methods fail to accurately detect and differentiate between different message sources.

There is therefore a need and it would be advantageous to have a system and method that accounts for the significant additional distinguishing features of the non-linearity of the bus system, and thereby generate a substantially more accurate and distinguishable signature from the rising portion and the falling portion the respective pulses of each ECU on a CAN bus.

SUMMARY OF THE INVENTION

It is an intention of the present disclosure to provide a system for determining the originator of each CAN bus message, based on the shape of the message pulses and independent of the message content and designated functionality of the originator ECU.

It is another intention of the disclosure to provide a system for generating a signature the is uniquely associated with an ECU on the CAN bus, having a specific physical configuration.

It is another intention of the disclosure to provide a system for securing the integrity and authenticity of the CAN bus components.

It is still another intention of the disclosure to provide a system for detecting when a message is sent with a disguised ID in try to disguise the ECU that originated the message.

It is still another intention of the disclosure to provide a system for detecting any unauthorized installation of a malicious ECU on the CAN bus.

Other intentions and advantages of the disclosure will become apparent as the description proceeds.

According to the teachings of the present disclosure, there is provided a method for creating an ECU-signature for an ECU, the ECU being integrally operating within a CAN-bus sub-system of a vehicle, the CAN-bus sub-system having at least two ECUs, the method including the steps of:
  a) reading and storing into a memory storage a plurality of CAN-bus messages, wherein each of the CAN-bus message is generated by an ECU of the at least two ECUs;
  b) based on the non-linearity of the CAN bus, determining from at least one pulse of each of the read message a training-signature, wherein each of the training-signatures includes a pair of sub-signatures:
    i) a rising-sub-signature of the rising response, being the impulse response of the rising section of the at least one pulse of the CAN bus system, as viewed by the message generating ECU; and
    ii) a falling-sub-signature of the falling response, being the impulse response of the falling section of the at least one pulse of the CAN bus system, as viewed by the message generating ECU; and
  c) for each of the message generating ECUs, determine a unique ECU-signature from the respective training-signatures.

Preferably, the creating of an ECU-signature is performed for all ECUs operating in the CAN-bus sub-system of the vehicle, wherein the method further includes the steps of:
  d) extracting from each of the read CAN-bus messages a respective training message-ID;
  e) associating each of the training message-ID with a respective training signature that correspond to a mutual read message;
  f) recording each of the associated pair of a training signature and a training message-ID; and
  g) classifying all of the pairs of the respective training message-IDs and training signatures, yielding K trained-classes, each of the trained-class having a unique signature-vector, wherein each of the trained-classes represents an ECU of the at least two ECUs, and the unique signature-vector is the ECU-signature of that ECU.

Typically, the ECU-signature creating method further including the step of recording the triplets of ECU-features, each including a training signature, a training message-ID and respective ECU-ID, in a non-volatile memory storage.

Typically, the read messages are stored in a temporary memory storage.

The CAN-bus sub-system may be replaced by a vehicle bus sub-system selected from the group including Can-FD, Flexray, and Automotive Ethernet Standards.

According to further teachings of the present disclosure, there is provided a system for creating a unique ECU-signature for an ECU, the ECU being integrally operating within a CAN-bus sub-system of a vehicle, the CAN-bus sub-system having at least two ECUs, the system includes a classifier including a controller, a listening-sensor and typically, a temporary memory storage. During a training stage, the classifier is configured to:
  a) by the listening-sensor, read from the CAN-bus a plurality of CAN-bus messages, wherein each of the CAN-bus message is generated by an ECU of the at least two ECUs, and store the read CAN-bus messages in the temporary memory storage;
  b) based on the non-linearity of the CAN bus, determining from at least one pulse of each of the read message a training-signature, wherein each of the training-signatures includes a pair of sub-signatures:
    i) a rising-sub-signature of the rising response, being the impulse response of the rising section of the at least one pulse of the CAN bus system, as viewed by the message generating ECU; and
    ii) a falling-sub-signature of the falling response, being the impulse response of the falling section of the at least one pulse of the CAN bus system, as viewed by the message generating ECU; and
  c) for each of the message generating ECUs, determine by the controller a unique ECU-signature from the respective training-signatures.

Preferably, during the training stage, the classifier is further configured to:
  d) extract from each of the read CAN-bus messages a respective training message-ID;
  e) associate each of the training message-ID with a respective training signature that correspond to a mutual read message;
  f) store each of the ECU-IDs in a non-volatile memory storage, wherein the stored ECU-ID is associated with a single ECU-signature and with one or more message-IDs; and
  g) classify all of the pairs of the respective training message-IDs and training signatures, yielding K trained-classes, each of the trained-class having a unique signature-vector, wherein each of the trained-classes represents an ECU of the at least two ECUs, and the unique signature-vector is the ECU-signature of that ECU.

Typically, during the training stage, the classifier is further configured to store the triplets of ECU-features, each including a training signature, a training message-ID and respective ECU-ID, in a non-volatile memory storage.

Optionally, the classifier is an ECU.

According to further teachings of the present disclosure, there is provided a method for detecting unauthorized messages on a CAN bus system of a vehicle, including:

during a training stage:
  a) creating of an ECU-signature for all ECUs operating in the CAN-bus sub-system of the vehicle, as described here above;

during real-time operation:
  b) reading a CAN-bus message generated by an unknown ECU;
  c) extracting from the read CAN-bus message a real-time message-ID;
  d) based on the non-linearity of the CAN bus, determining from at least one pulse of the read CAN-bus message a real-time-signature, wherein the real-time-signature includes a pair of sub-signatures:
    i) a rising-sub-signature of the rising response, being the impulse response of the rising section of the at least one pulse of the CAN bus system, as viewed by the message generating ECU; and
    ii) a falling-sub-signature of the falling response, being the impulse response of the falling section of the at least one pulse of the CAN bus system, as viewed by the message generating ECU;
  e) determining a $class_X$ of the K trained-classes, to which the real-time-signature belongs;
  f) identifying the $ECU_X$ associated with $class_X$;
  g) if no $class_X$ is found, then it is determined that an unauthorized message was sent from an ECU that was installed without authorization;
  h) extracting the one or more training message-IDs associated with $ECU_X$;
  i) comparing the real-time message-ID with any one of the extracted training message-IDs;
  j) if a match is detected, go back to step (b) for reading a next message; and
  k) if no match is found, then:
    i) it is concluded that an unauthorized actor took control of an ECU;
    ii) taking a preconfigured appropriate action; and
    iii) go back to step (b) for a next message.

The method for detecting unauthorized messages is typically further adapted to take an appropriate action includes issuing an alert for an unauthorized message.

Typically, the unauthorized message is a malicious message.

According to further teachings of the present disclosure, there is provided a system for creating a unique ECU-signature for an ECU, the ECU being integrally operating within a CAN-bus sub-system of a vehicle, the CAN-bus sub-system having at least two ECUs, the system includes a classifier including a controller, a listening-sensor and typically, a temporary memory storage. During a training stage, the classifier is configured to:
  a) create of an ECU-signature for all ECUs operating in the CAN-bus sub-system of the vehicle, as described here above; and during real-time operation, the classifier is configured to:
  b) read a CAN-bus message generated by an unknown ECU;
  c) extract from the read CAN-bus message a real-time message-ID;
  d) based on the non-linearity of the CAN bus, determine from at least one pulse of the read CAN-bus message a real-time-signature, wherein the real-time-signature includes a pair of sub-signatures:
    i) a rising-sub-signature of the rising response, being the impulse response of the rising section of the at least one pulse of the CAN bus system, as viewed by the message generating ECU; and
    ii) a falling-sub-signature of the falling response, being the impulse response of the falling section of the at least one pulse of the CAN bus system, as viewed by the message generating ECU;
  e) determine a $class_X$ of the K trained-classes, to which the real-time-signature belongs;
  f) identify the $ECU_X$ associated with $class_X$;
  g) extract the one or more training message-IDs associated with $ECU_X$;
  h) compare the real-time message-ID with any one of the extracted training message-IDs;
  i) if a match is found, go back to step (b) for a next message; and
  j) if a match is found, then:
    i) conclude that the read CAN-bus message is an unauthorized message;
    ii) take a preconfigured appropriate action; and
    iii) go back to step (b) for a next message.

Optionally, the classifier is an ECU.

Typically, the unauthorized message is a malicious message.

It should be noted that typically, if no $class_X$ is found, it is determined that an unauthorized message was sent from an ECU that was installed without authorization.

It should be noted that typically, if no match found when comparing the real-time message-ID with any one of the extracted training message-IDs, it is concluded that an unauthorized actor took control of an ECU.

According to further teachings of the present disclosure, there is provided a method for detecting unauthorized messages on a CAN bus system of a vehicle, wherein arbitration noise exists on the CAN bus, the method including:

during a training stage:
  a) creating of an ECU-signature for all ECUs operating in the CAN-bus sub-system of the vehicle, as in claim 3; and during real-time operation:
  b) reading a CAN-bus message generated by an unknown ECU;
  c) if reached the end of the message, then:
    i) it is concluded that an unauthorized actor took control of an ECU;
    ii) taking a preconfigured appropriate action; and
    iii) exit;
  d) selecting the next pulse of said read CAN-bus message;
  e) based on the non-linearity of the CAN bus, determining from said selected pulse of said read CAN-bus message a real-time-signature, wherein said real-time-signature comprises a pair of sub-signatures:
    i) a rising-sub-signature of the rising response, being the impulse response of the rising section of said at least one pulse of the CAN bus system, as viewed by said message generating ECU; and
    ii) a falling-sub-signature of the falling response, being the impulse response of the falling section of said at least one pulse of the CAN bus system, as viewed by said message generating ECU;
  f) determining a $class_X$ of said K trained-classes, to which said real-time-signature belongs;

g) if no $class_X$ is found, then go back to step (d) to select the next pulse;
h) extracting from said read CAN-bus message a real-time message-ID;
i) identifying the $ECU_X$ associated with $class_X$;
j) extracting the one or more training message-IDs associated with $ECU_X$;
k) comparing said real-time message-ID with any one of said extracted training message-IDs;
l) if a match is detected, go back to step (b) for reading a next message; and
m) if no match is found, then:
  i) it is concluded that an unauthorized actor took control of an ECU;
  ii) taking a preconfigured appropriate action; and
  iii) go back to step (b) for reading a next message.

According to further teachings of the present disclosure, there is provided a system for detecting unauthorized messages on a CAN bus system of a vehicle, wherein arbitration noise exists on the CAN bus, the CAN-bus sub-system having at least two ECUs, the system comprises a classifier that comprises:
a) a controller;
b) a listening-sensor; and
c) a temporary memory storage;
wherein, during a training stage, said classifier is configured to:
a) create of an ECU-signature for all ECUs operating in the CAN-bus sub-system of the vehicle, as in claim 8; and
during real-time operation, said classifier is configured to:
b) read a CAN-bus message generated by an unknown ECU;
c) if reached the end of the message, then:
  i) it is concluded that an unauthorized actor took control of an ECU;
  ii) take a preconfigured appropriate action; and
  iii) exit;
d) select the next pulse of said read CAN-bus message
e) based on the non-linearity of the CAN bus, determine from at least one pulse of said read CAN-bus message a real-time-signature, wherein said real-time-signature comprises a pair of sub-signatures:
  i) a rising-sub-signature of the rising response, being the impulse response of the rising section of said at least one pulse of the CAN bus system, as viewed by said message generating ECU; and
  ii) a falling-sub-signature of the falling response, being the impulse response of the falling section of said at least one pulse of the CAN bus system, as viewed by said message generating ECU;
f) determine a $class_X$ of said K trained-classes, to which said real-time-signature belongs;
g) if no $class_X$ is found, then go back to step (d) to select the next pulse;
h) extract from said read CAN-bus message a real-time message-ID;
i) identify the $ECU_X$ associated with $class_X$;
j) extract the one or more training message-IDs associated with $ECU_X$;
k) compare said real-time message-ID with any one of said extracted training message-IDs;
l) if a match is found, go back to step (b) for a next message; and
m) if a match is found, then:
  i) conclude that said read CAN-bus message is an unauthorized message;
  ii) take a preconfigured appropriate action; and
  iii) go back to step (b) for a next message.

DETAILED DESCRIPTION OF PREFERRED EMBODIMENTS

Figure 1A:
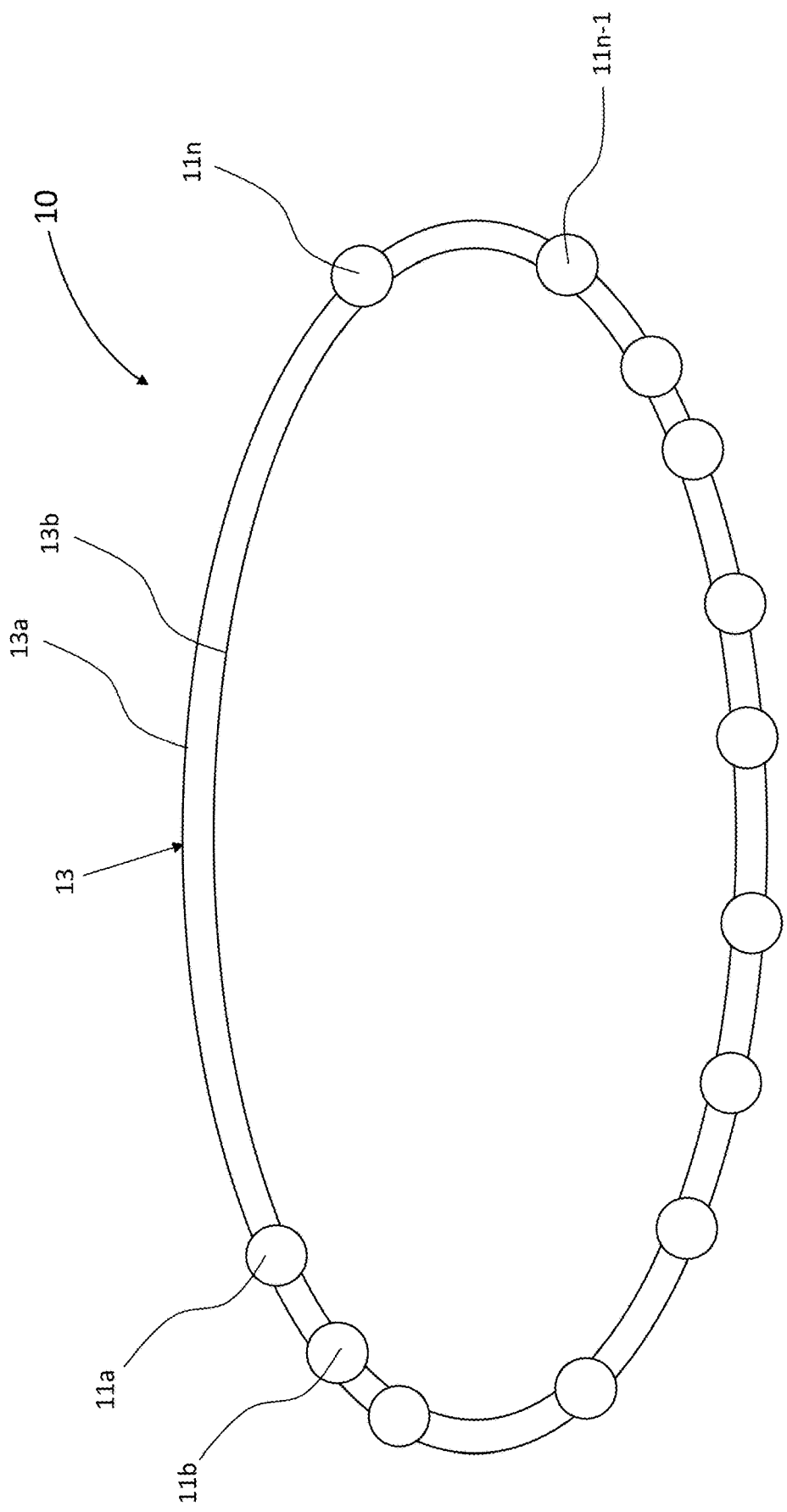
FIG. 1*a* schematically illustrates a typical computerized sub-system of a vehicle network, such as a CAN-bus.

The following description of the disclosed invention is not necessarily limited in its application to the details of construction and the arrangement of the components and/or methods/processes set forth in the following description and/or illustrated in the drawings. The disclosed invention is capable of other embodiments or of being practiced or carried out in various ways.

As will be appreciated by one skilled in the art, aspects of the present disclosure may be embodied as a system, methods/processes or computer program or products. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more non-transitory computer readable (memory storage) medium(s) having computer readable program code embodied thereon.

An embodiment is an example or implementation of the disclosed invention. The various appearances of "one embodiment," "an embodiment" or "some embodiments" do not necessarily all refer to the same embodiment. Although various features of the disclosed invention may be described in the context of a single embodiment, the features may also be provided separately or in any suitable combination.

Conversely, although the disclosed invention may be described herein in the context of separate embodiments for clarity, the disclosed invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the disclosure. It is understood that the phraseology and terminology employed herein are not to be construed as limiting and are for descriptive purpose only.

Throughout this document, numerous textual and graphical references are made to trademarks, and domain names. These trademarks and domain names are the property of their respective owners, and are referenced only for explanation purposes herein.

FIG. 1a schematically illustrates a typical computerized sub-system 10 of a vehicle network, such as a CAN-bus 13. It should be noted that the present invention will be described in terms of the vehicle bus being a Controller Area Network ("CAN bus"), which is the most common and robust vehicle bus standard designed to allow microcontrollers and devices to communicate with each other in applications without a host computer. However, the present invention is not limited to the vehicle bus being a CAN bus, and other protocols that are used on board of a vehicle are, for example, Can-FD, Flexray, and Automotive Ethernet Standards, may be used within the scope of the present disclosure.

Sub-system 10 includes a plurality of ECUs (also known as "nodes") 11a-11n, each controlling or monitoring one or more devices or schemes of the vehicle, such as the gas pedal, the brakes pedal, the steering wheel, the cabin temperature monitoring and setting, the air bags, the gear states, etc. The vehicle may include tens of such ECUs 11a-11n, while the ECUs 11a-11n communicate with one another and with the relevant controlled or monitored devices or schemes via CAN-bus 13. All the nodes 11 of the CAN bus 13 are typically connected to the bus through a two-wires 13a and 13b connection. The wires (13a and 13b) are typically a twisted pair with a 120Ω (nominal) characteristic impedance.

Figure 1B:
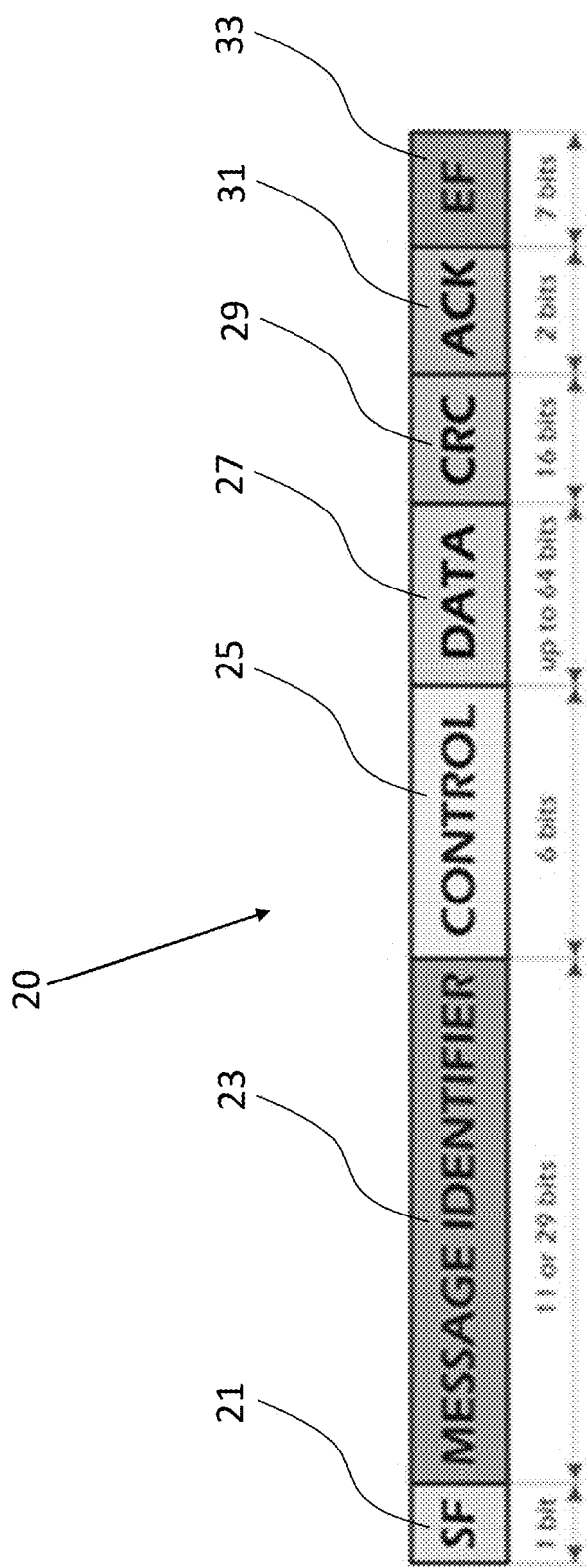
FIG. 1*b* (prior art) schematically illustrates the structure of a CAN-bus message.

The communication via CAN-bus 13 uses a message-based protocol. Reference is also made to FIG. 1b that schematically shows the structure of a CAN-bus message 20. The message 20 includes the following fields: SF (Start of Field) 21, message identifier 23, Control 25, Data 27, CRC 29, Ack 31, and EF (End of Frame) 33. The message identifier 23 (also referred to herein as "message-ID" 23) typically indicates a vehicle control function or application (for example, airbag message, gear control message, wheel drive message, etc.) and the level of priority of the data protocol. In fact, message-ID 23 defines to some degree, the message originator, as each ECU may be associated with one, or a few different message-IDs, depending on how many different applications/functions a particular ECU is preconfigured execute. Depending on a specific format being used, the length of the Message Identifier can be either 11-bits in a standard format, or 29-bits in an extended CAN bus format. The SF field 21 indicates which of the two formats is used. The Control Field 25, also known as the Check Field, displays the number of items of information contained in the data field. The Control field allows any receiver of the message to check whether the received message has all the information transferred. The Data Field 27 contains the actual information transmitted on the bus 13, namely the information that can be read by any other ECU 11. The CRC field 30 is a Cyclic Redundancy Check field, that contains 15-bits cyclic redundancy check code. The ACK Field 32, namely the Acknowledge Field, allows any receiver of the transmitted message to signal to the message-originator that it has correctly received a message. If an error is detected, the receiver notifies the message originator immediately. The message originator may then resend the message. The terms "car" and "vehicle" are used herein interchangeably.

As noted above, a significant method by which a malicious actor may exploit the system is by acquiring control of an existing (valid) ECU, and may then send via this ECU malicious messages, while substituting within each of these messages a disguised message-ID (namely, a message-ID that is typically used by another valid ECU), to thereby pretend that these messages are validly sent via that another valid ECU.

Another a malicious actor may add a new and malicious ECU to the system (for example, during maintenance of the vehicle at an unauthorized car shop), and may then send malicious messages via this newly-added ECU.

Such malicious messages, when sent by either of the two methods or some other methods, can perform substantially any of the vehicle's activities, for example, causing acceleration of the vehicle, activation of the brakes, activation of the steering wheel, change of a gear state, turn ON or OFF the lights, and a variety of other actions.

Figure 2A:
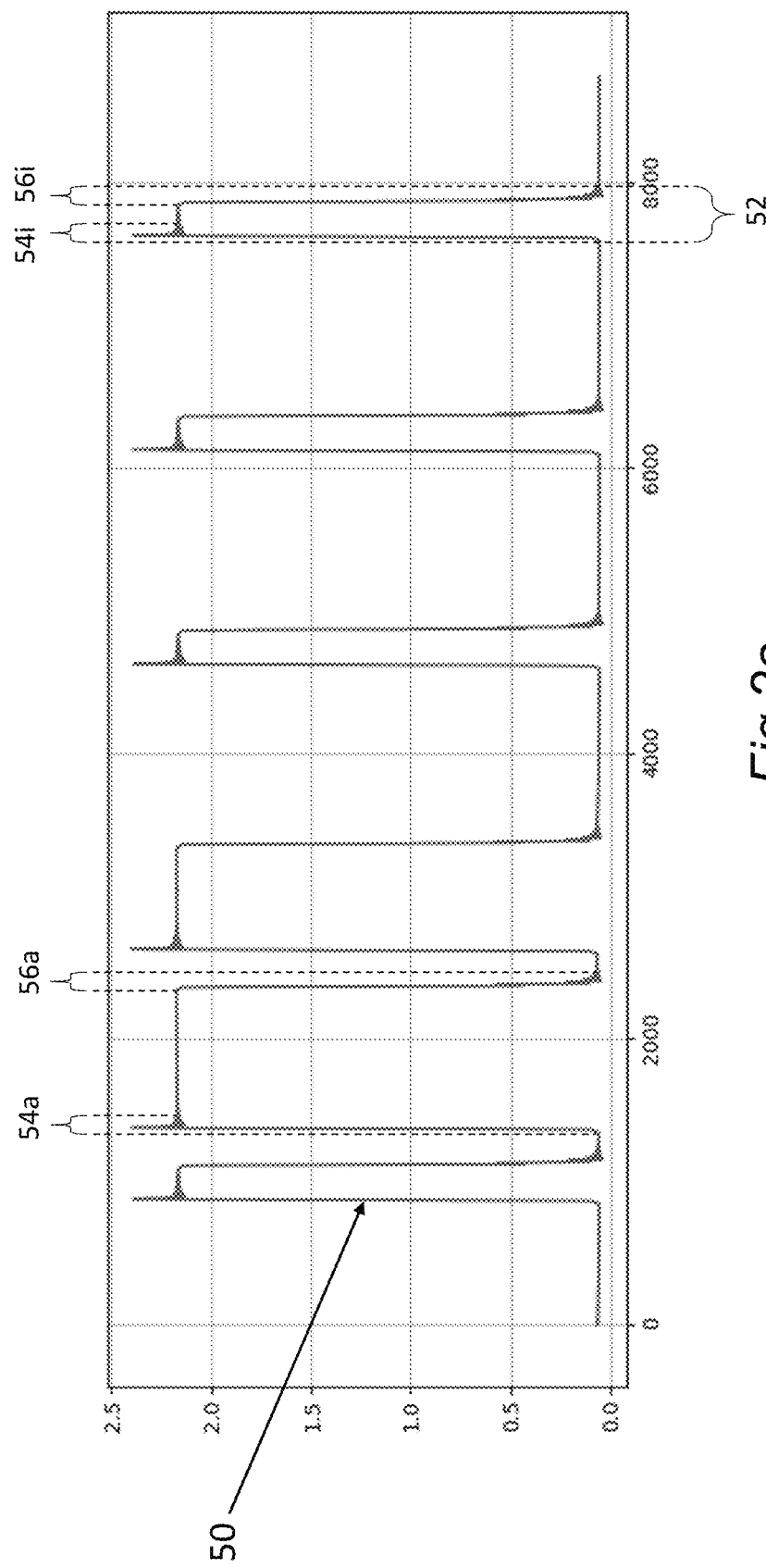
FIG. 2*a* (prior art) shows a typical sequence of pulses of a segment of a CAN-bus message that was sent by a specific ECU.

FIG. 2a shows a typical sequence of pulses of a message 50, that was transmitted by one specific ECU 11. As can be seen, the pulses 52 of a signal message 50 include a rising portion 54 and a falling portion 56. While the pulses generated by an ECU 11 may vary, for example in their amplitude, the impulse response of a CAN bus system with the same physical configuration, does not change. The physical characteristics of a CAN bus 13 system, namely, the wiring, the ECUs 11, and the other components that are connected to the bus—as "seen" by each specific message-transmitting ECU 11, respectively, is different. As is known from circuit control theory, each component in fact "sees" a different circuit, while transmitting a message, i.e., the transmitting ECU 11 sees the rest of the components of circuit, excluding the transmitting ECU 11 itself. The fact that each ECU 11 is in fact somewhat physically different from the others (even slightly), causes the shape of the impulse response of pulses 52 to be of unique characteristics (i.e., having distinguishing features) to the specific ECU 11 that initiated them. The shape of the impulse response of pulses 52 is uniquely characteristic to each transmitting ECU 11, and is not supposed to change unless the physical configuration of the CAN bus system 10 is changed (e.g., by adding or removing an ECU 11 to the system, change the wiring, etc.). Therefore, the shape of the impulse response resulting from a pulse 52, forms a basis for determining which ECU is 11 is the originator of pulse 52, and in fact, the originator of each specific message.

When linearity is assumed for CAN bus 13, from circuit theory it is known that:

$$s(t)=h(t)*x(t)$$

where x(t) is the originally transmitted ideal pulse 52 (in the present disclosure a substantially square pulse 52), h(t) is the impulse response of the system (in the present case, the system is the entire CAN bus 13, as seen by the transmitting ECU) 11, and s(t) is the resulting pulse on CAN bus 13. In the assumption of linearity, h(t) can be found, for example, by applying Fourier transform, or Laplace transform to move to the frequency domain, dividing $S(\omega)$ by $X(\omega)$ (or $S(s)$ by $X(s)$ respectively), and converting the result back to the time domain, or other known methods.

However, the assumption of linearity of CAN bus 13 sub-system 10 is incorrect. As a matter of fact, there is a significant difference in the patterns and therefor in the signatures, between the impulse response of the rising portion 54 and the impulse response of the falling portion 56 of a pulse 52.

The embodiments of the present disclosure utilize the non-linearity characteristic of the CAN bus system 13 to obtain a pair of sub-signatures from each message, wherein the sub-signatures are respectively associated with the rising response portion and falling response portion the pulses 52. This pair of sub-signatures (of the rising response and the falling response sub-signatures) forms a unique signature of the transmitting ECU 11, which signature enables to identify the message originator ECU 11, irrespective of the message content. In fact, as all the impulse responses of the pulses 52 of each message, that were originated by a specific ECU 11, are substantially the same (differing only by their duration), it is sufficient to obtain the pair of sub-signatures from the impulse response of a single pulse 52 of each message. In order to obtain the pair, the pulse 52 is divided to its rising and falling portions (54 and 56), accordingly. Two pseudo impulse responses of the non-linear system are calculated separately for the rising and falling portions (54 and 56) of the pulse 52 by applying the technique above, resulting in a pair of sub-signatures that distinguishably characterize each transmitting ECU 11. A pair of the sub-signatures is uniquely associated with a particular transmitting ECU 11 and is non-imitable.

Figure 2B:
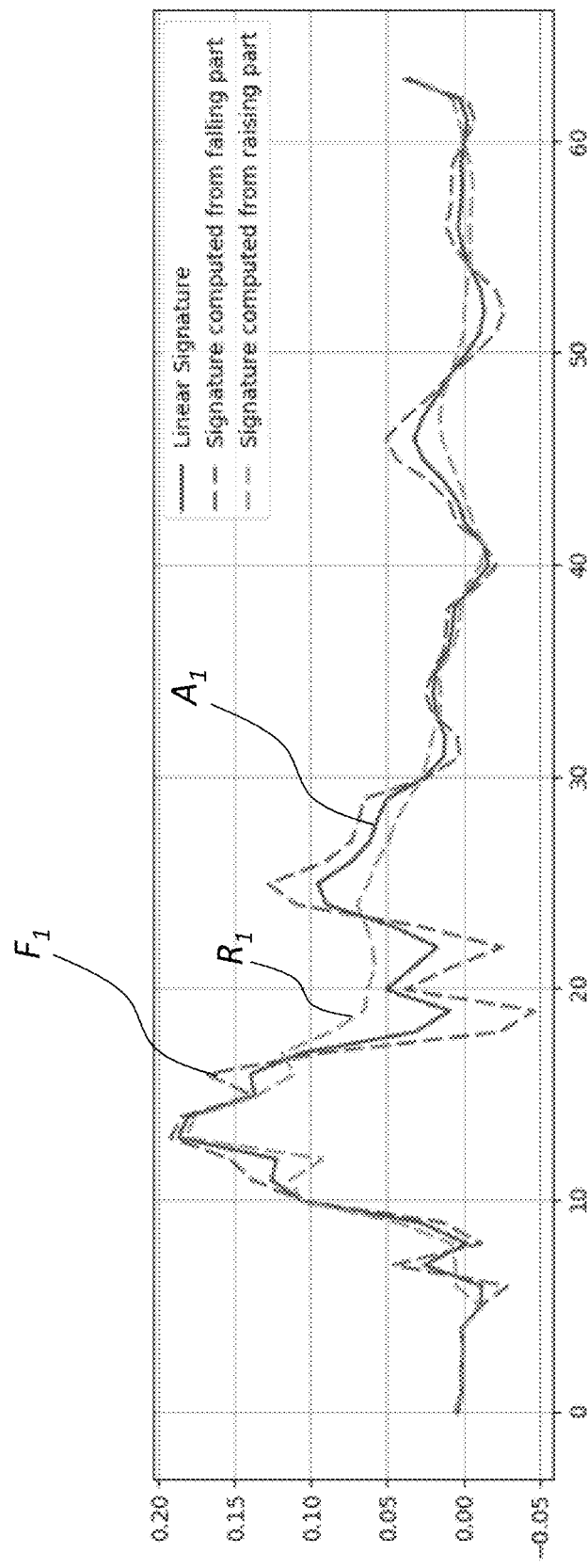
FIG. 2*b* shows a pair of sub-signatures as calculated from the sequence of pulses shown in FIG. 2*a*, and associated with the originator ECU.

FIG. 2b shows a pair of sub-signatures ($R_1$, $F_1$) as calculated for the example message 50 shown in FIG. 2a. The sub-signature (i.e., the impulse response) for the rising portion is indicated by $R_1$, while the sub-signature (i.e., the impulse response) for the falling portion is indicated by $F_1$. It can be observed that the rising portion $R_1$ is substantially different than the falling portion $F_1$. There is a significant difference in the patterns and therefor in the signatures, between the responses of the rising $R_1$(54) and the falling $F_1$(56) portions of pulses 52. It is noted that the graph indicated by $A_1$, represents an assumtion that CAN bus sub-system 10 is linear, implying that the responses of the rising $R_1$ (54) and the falling $F_1$ (56) portions of a pulse 52 are equal.

Figure 2C:
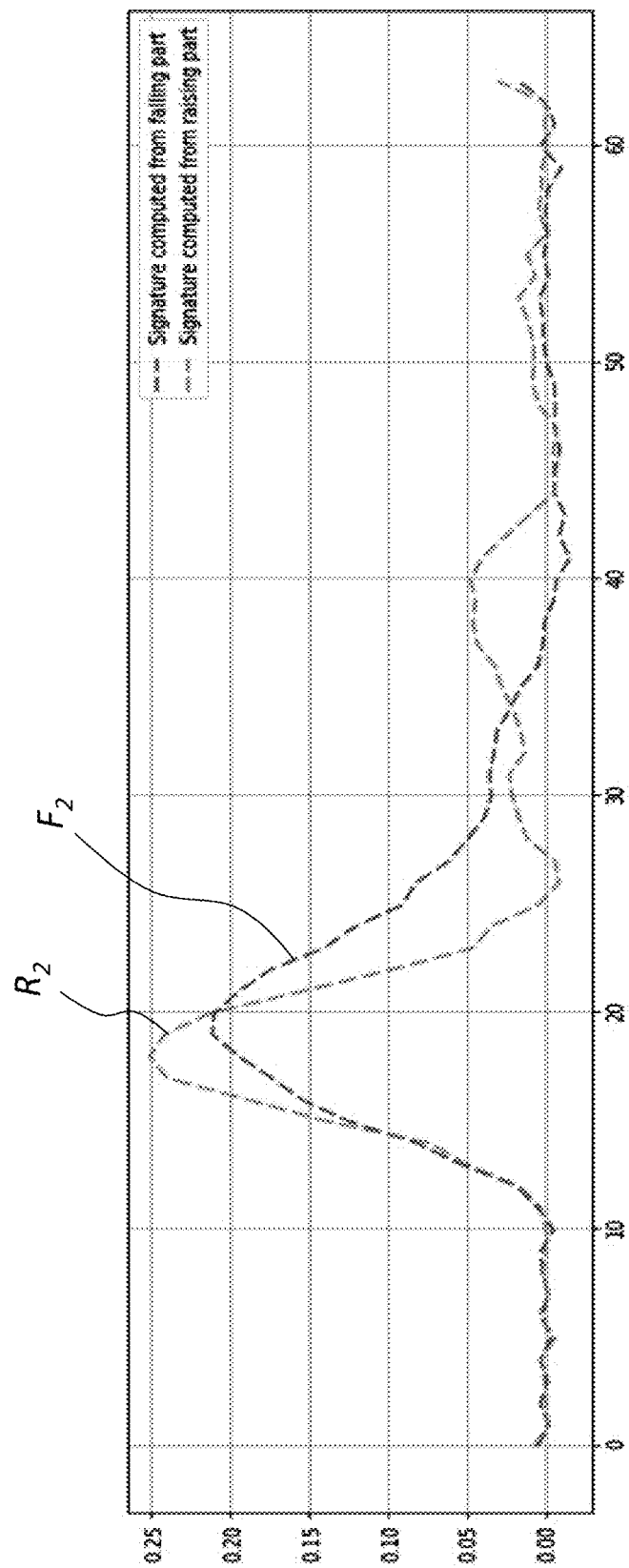
FIG. 2*c* shows a pair of sub-signatures as calculated from another sequence of pulses.

FIG. 2c shows another pair of sub-signatures as calculated for another example message (not shown). The sub-signature (i.e., the impulse response) for the rising portion is indicated by $R_2$, while the sub-signature (i.e., the impulse response) for the falling portion is indicated by $F_2$. It can be observed that the rising portion $R_2$ is substantially different than the falling portion $F_2$. As can be further observed, the rising impulse response of $R_1$ is substantially different from $R_2$. Similarly, the falling impulse response $F_1$ is substantially different from $F_2$. Therefore, the pair of the sub-signatures ($R_2$, $F_2$) of each message can distinguishably characterize the transmitting ECU 11 of the message, and can clearly serve as an indication to the identity of the transmitting ECU 11 that transmitted this specific message. This combined signature indication that evolves from the physical configuration characteristics of the CAN bus 13 components 11, clearly distinguishes between the various transmitting ECUs 11, and cannot be disguised. It is noted that the graph indicated by $A_3$, represents an assumtion that CAN bus sub-system 10 is linear.

Figure 2D:
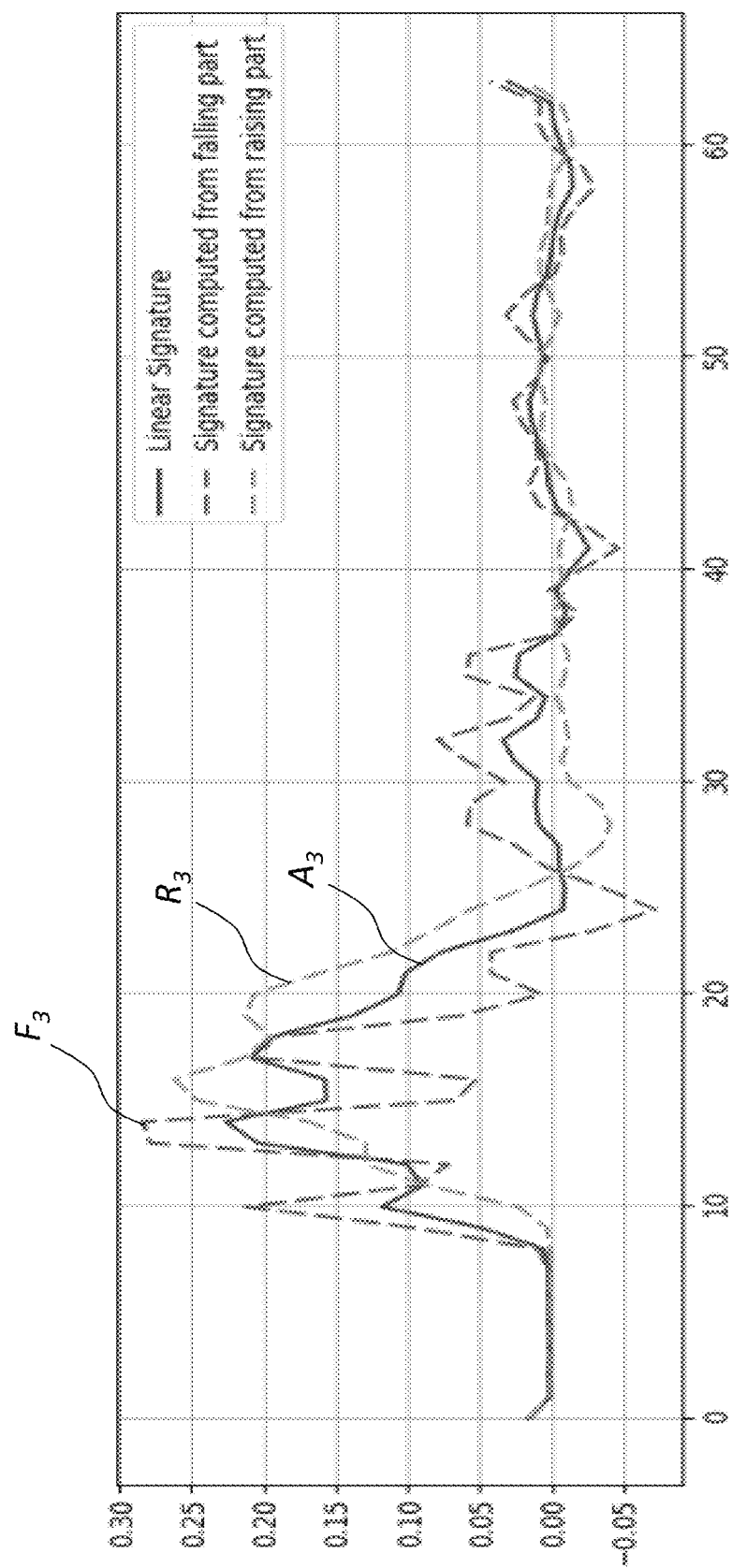
FIG. 2*d* shows a pair of sub-signatures as calculated from another sequence of pulses.

FIG. 2d shows another pair of sub-signatures ($R_3$, $F_3$) as calculated for another example message (not shown). The sub-signature (i.e., the impulse response) for the rising portion is again indicated by $R_3$, while the sub-signature (i.e., the impulse response) for the falling portion is indicated by $F_3$. It can be observed that the rising portion $R_3$ is substantially different than the falling portion $F_3$. As can be clearly seen, the rising impulse response of the system $R_3$ is substantially different from $R_1$ and $R_2$. Similarly, the falling impulse response $F_3$ is substantially different from $F_1$ and $F_2$. Therefore, the pair of the sub-signatures ($R_3$, $F_3$) of each message can distinguishably characterize the transmitting ECU 11 of the message, and can clearly serve as an indication to the identity of the transmitting ECU 11 that transmitted this specific message. This combined signature indication that evolves from the physical configuration characteristics of the CAN bus 13 components 11, clearly distinguishes between the various transmitting ECUs 11, and cannot be disguised. It is noted that the graph indicated by $A_3$, represents an assumtion that CAN bus sub-system 10 is linear.

Figure 3:
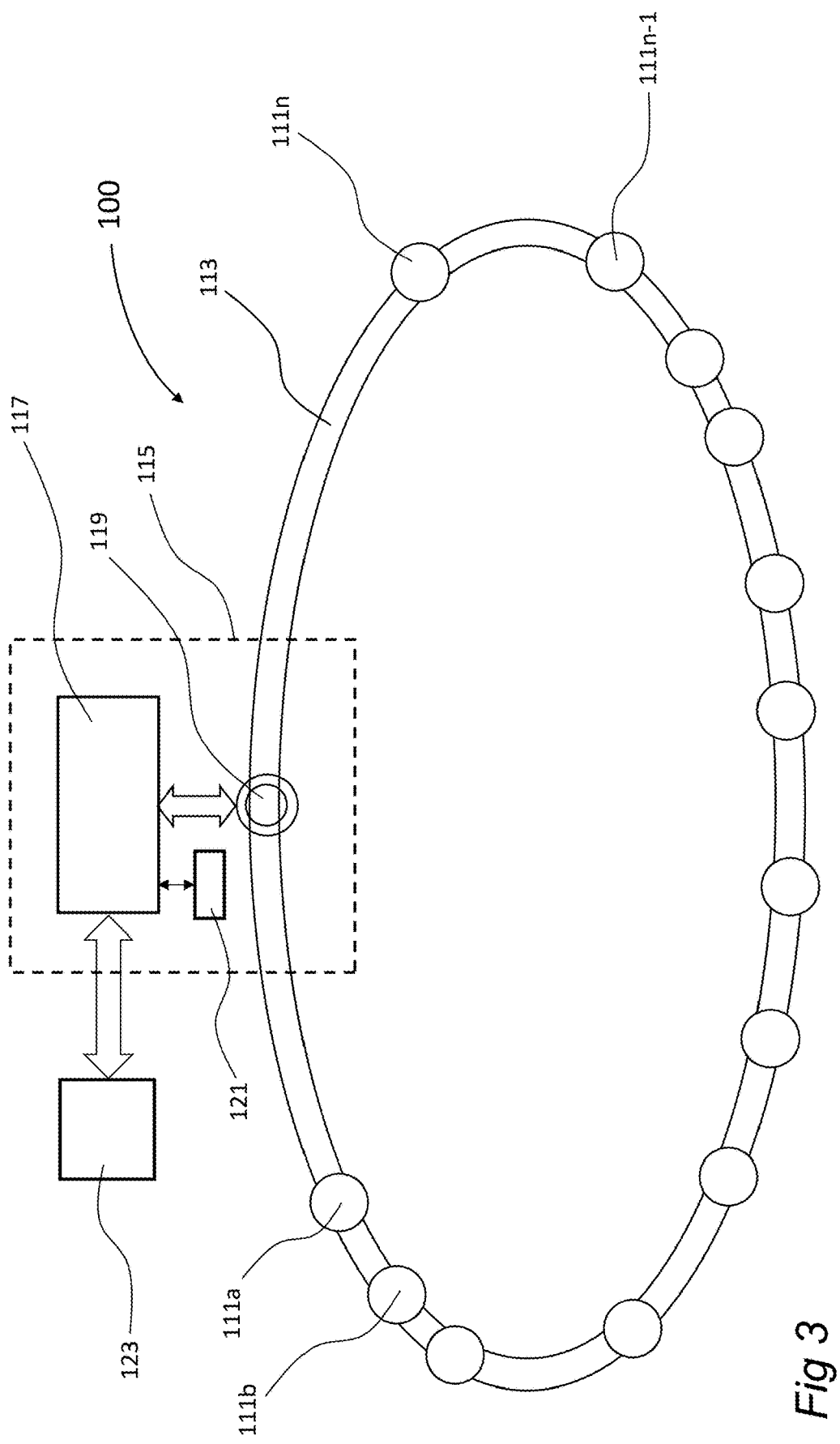
FIG. 3 schematically illustrates a computerized sub-system of a vehicle network, according to an embodiment of the present disclosure.

FIG. 3 schematically illustrates a computerized sub-system 100 of a vehicle network, such as a CAN-bus 113, according to an embodiment of the present disclosure. In similarity to the prior art sub-system 10, sub-system 100 of the present disclosure includes a plurality of ECUs 111a-111n, each controlling one or more devices or schemes of the vehicle, such as the gas pedal, the brakes pedal, the steering wheel, the cabin temperature monitoring and setting, the air bags, etc. The ECUs 111a-111n communicate with one another or with a respective controlled or monitored devices or schemes over the CAN-bus 113. In addition, the sub-system 100 includes a classifier 115. Classifier 115, that may have a form of an ECU 111, generally includes a controller 117, a listening-sensor 119, and a memory storage 121. The classifier 115 has two operational stages, a training stage and a real-time stage.

During the training stage, classifier 115 is activated to record a flow of messages over CAN-bus 113. More specifically, listening-sensor 119 "listens" to the flow of information over CAN-bus 113 during a period $T_1$ of, for example only, with no limitations, 1 hour. The flow of the messages during period $T_1$ is recorded by controller 117, and stored, for example, within temporary memory storage 121. Next, still during the training stage, controller 117 begins to calculate, in a manner as described above, a pair of sub-signatures (R, F) for each message-ID 23 (the message-ID 23 is determined from the message content). As noted above, a single ECU 111 may validly send messages having different message-IDs (23). Moreover, two messages having a same message-ID (23) are not expected to be sent, under normal operational circumstances, via two different ECUs 111.

In view of the fact that each ECU 111 issues a different signature, the classifier 115, during the training stage, determines N different signature classes, wherein each class represents a different ECU 111, and is associated with a single unique signature. The ECUs 111 are then arbitrarily number, regardless of different functionality of each ECU 111. Hence, classifier 115 defines the number of ECUs 111 operating on CAN-bus 113, in accordance to the number of different classes of signatures that classifier 115 has found (wherein each signature includes a pair of sub-signatures R and F), and the classifier 115 respectively associates each different signature with a respective different ECU 111 and stores that association, for example, with no limitations, in a "signatures-table", as shown in Table 1.

It should be noted that the signatures-table is given as an example of a common format of storing N calculated signatures (for use in the real-time stage), and the set of N calculated signatures may be stored in any other storage format, such as in a database or and other defined data-set.

The present disclosure will be described here on as the defined data-set being a "table", but the present disclosure is not limited to tables only, and any defined data-set known in the art may be used.

TABLE 1

| ECU number | Message-ID | SIGNATURE |
|---|---|---|
| 1 | one or more message-IDs | $S_{1R}, S_{1F}$ |
| 2 | one or more message-IDs | $S_{2R}, S_{2F}$ |
| 3 | one or more message-IDs | $S_{3R}, S_{3F}$ |
| ... | | ... |
| i | one or more message-IDs | $Si_R, Si_F$ |
| ... | | ... |
| N | one or more message-IDs | $Sn_R, Sn_F$ |

The classifier 115 further associates each message-ID 23 in the example table with the respective signature, which signature is also associated with the respective ECU 111. It should be noted that several different message-IDs may be associated with a single ECU 111, if their respective signature is the same. As a result, at the end of the training stage, each ECU 111 in the signatures-table is associated with a single signature, and with one or more respective message-IDs 23. Therefore, upon completion of the training stage, the controller 117 stores the signatures-table within a non-volatile memory storage 123. It should be noted that temporary memory storage 121 and non-volatile storage 123 may in practice be portions of a same memory.

More specifically, during the training, stage controller 117 of classifier 115 analyses the data accumulated during period $T_1$ within the temporary memory storage 121, and associates with each ECU number a specific signature that consists of a pair of sub-signatures (such as, $S_{2R}$, $S_{2F}$ for the ECU number 2 and $S_{iR}$, $S_{iF}$ for the ECU number Each of the sub-signatures is stored in digital form of the respective curve (such the R and F curves of the sub-signatures, respectively, shown in FIGS. 2b, 2c and 2d). Furthermore, the controller 117 associates the respective one or more message-IDs 23 to the respective signature (and therefore also to the respective ECU 111).

EXAMPLE

The following is an example table that has been prepared by a classifier according to the invention for Renault Zoe, 2018 (the specific signatures and their sub-signatures are not shown):

TABLE 2

| ECU number | Message-ID | SIGNATURE |
|---|---|---|
| 1 | 1015, 1074 | $S_{11}, S_{12}$ |
| 2 | 860, 1362, 1502, 1503, 1518, 1519 | $S_{21}, S_{22}$ |
| 3 | 1272 | $S_{31}, S_{32}$ |
| 4 | 504, 1081, 1498 | $S_{41}, S_{42}$ |
| 5 | 697, 1588 | $S_{51}, S_{52}$ |
| 6 | 304, 530, 536, 1274, 1649, 1784 | $S_{61}, S_{62}$ |
| 7 | 913 | $S_{71}, S_{72}$ |
| 8 | 1675 | $S_{81}, S_{82}$ |
| 9 | 378, 382, 390, 394, 502 | $S_{91}, S_{92}$ |

As shown in Table 2 above, a CAN bus 113 of the Renault Zoe accommodates 9 ECUs 111 that are indicated in Table 2 as ECU1-ECU9. Several of the ECUs 111 (such as ECU 7) can issue messages having only a single message-ID 23, while others may issue messages with several different message-IDs 23 (for example, ECU 4 can issue 3 different message-IDs 23). However, it can be seen that each specific message-ID 23 can be issued by only a single specific ECU 111.

Figure 4:
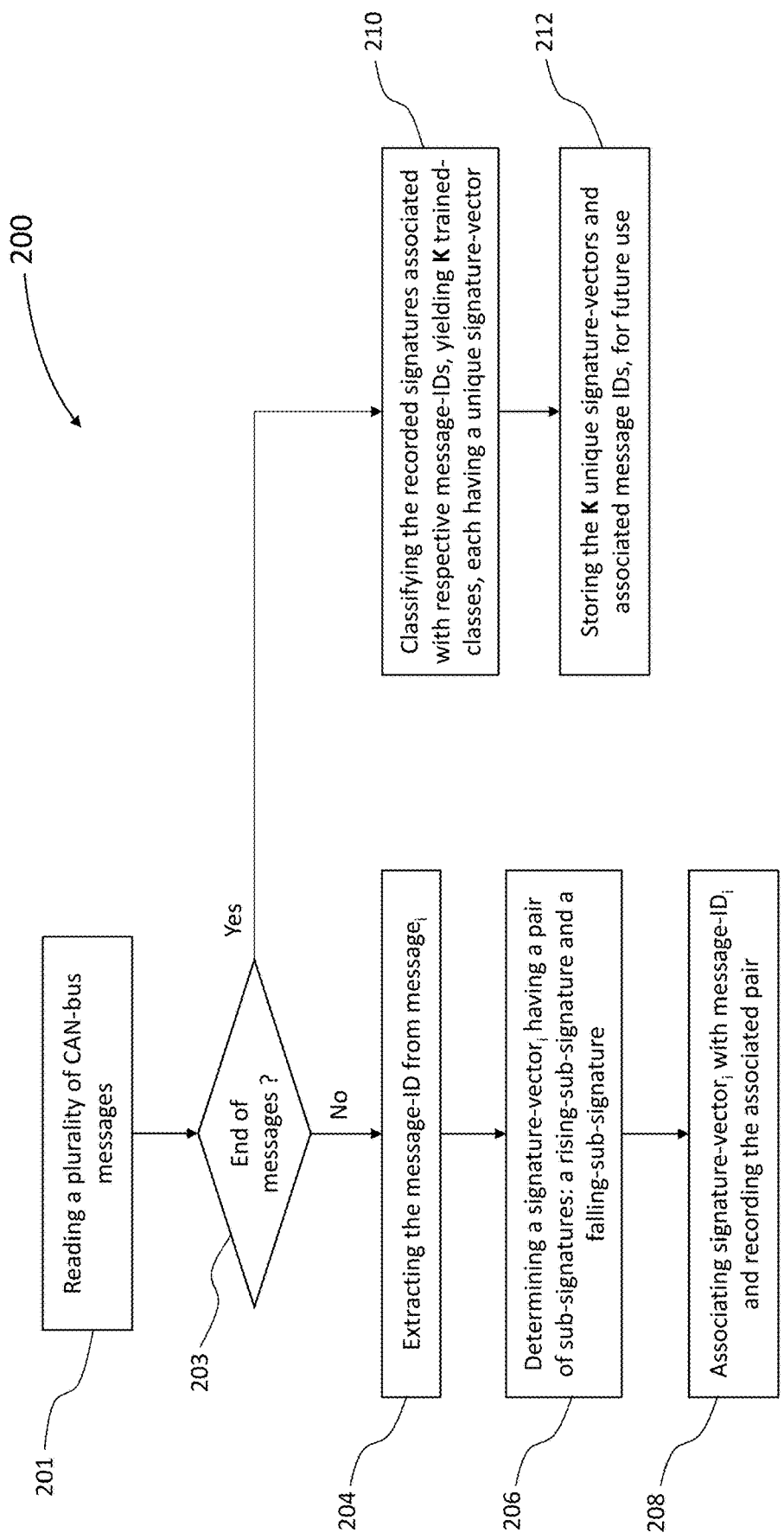
FIG. 4 illustrates a training method according to an embodiment of the disclosure, in a flow-diagram form, according to an embodiment of the present disclosure.

FIG. 4 illustrates a flow-chart diagram of the methodology 200 of creating an ECU-signature for an ECU, also referred to as a training stage, wherein the training method 200 is performed as a preliminary process of the real-time operational stage of sub-system 100. In step 201 a flow of CAN bus messages 20 on the CAN bus 113 is read and stored in temporary memory storage 121. In step 204, for each read CAN bus message; 20, training method 200 proceeds with the following steps:

step 204: Extracting the message-ID from message$_i$.

The training procedure extracts the message-ID from message$_i$ from the next read message$_i$ 20.

step 206: Determining a signature-vector$_i$.

The training procedure determining a signature-vector; having a pair of sub-signatures: a rising-sub-signature and a falling-sub-signature.

step 208: Associating the signature-vector$_i$ with message-ID$_i$.

The training procedure associates the message-ID$_i$ with the respective training signature$_i$ (as determined for the same message).

Steps 204, 206 and 208 are repeated for all of the read CAN bus messages that are stored in the temporary memory storage 121. At the end of this sub-process, a group of paired message-IDs and respective training signatures are stored in memory storage 121.

The training procedure now proceeds with step 210, wherein classifier 115 performs a classification process of the signature vectors accumulated in memory storage 121, each associated with a message-ID. In view of the fact that each ECU 111 issues a different signature, the classifier 115, determines K different signature classes, wherein each class represents a different ECU 111, and is associated with a single unique signature. The ECUs 111 are then arbitrarily number, regardless of different functionality of each ECU 111. Hence, classifier 115 defines the number of ECUs 111 operating on CAN-bus 113, in accordance to the number of different classes of signatures that classifier 115 has found (wherein each signature includes a pair of sub-signatures R and F), and the classifier 115 respectively associates each different signature with a respective different ECU 111 and stores that association in step 212, for example, with no limitations, in a non-volatile memory storage 123.

Hence, the training stage yields a single and unique signature vector for each respective ECU, wherein each different ECU 111 is associated with a unique ECU-signature, and is associated with one or more message-IDs, all of which are stored as a defined data-set, such as a table, in a non-volatile memory storage 123, for later use in the real-time stage.

It should be noted that the classification process may use any common classification & prediction method such as, with no limitations, Support Vector Machine (SVM), Neural Network (NN) and Bagged Decision Tree (BDT).

Figure 5:
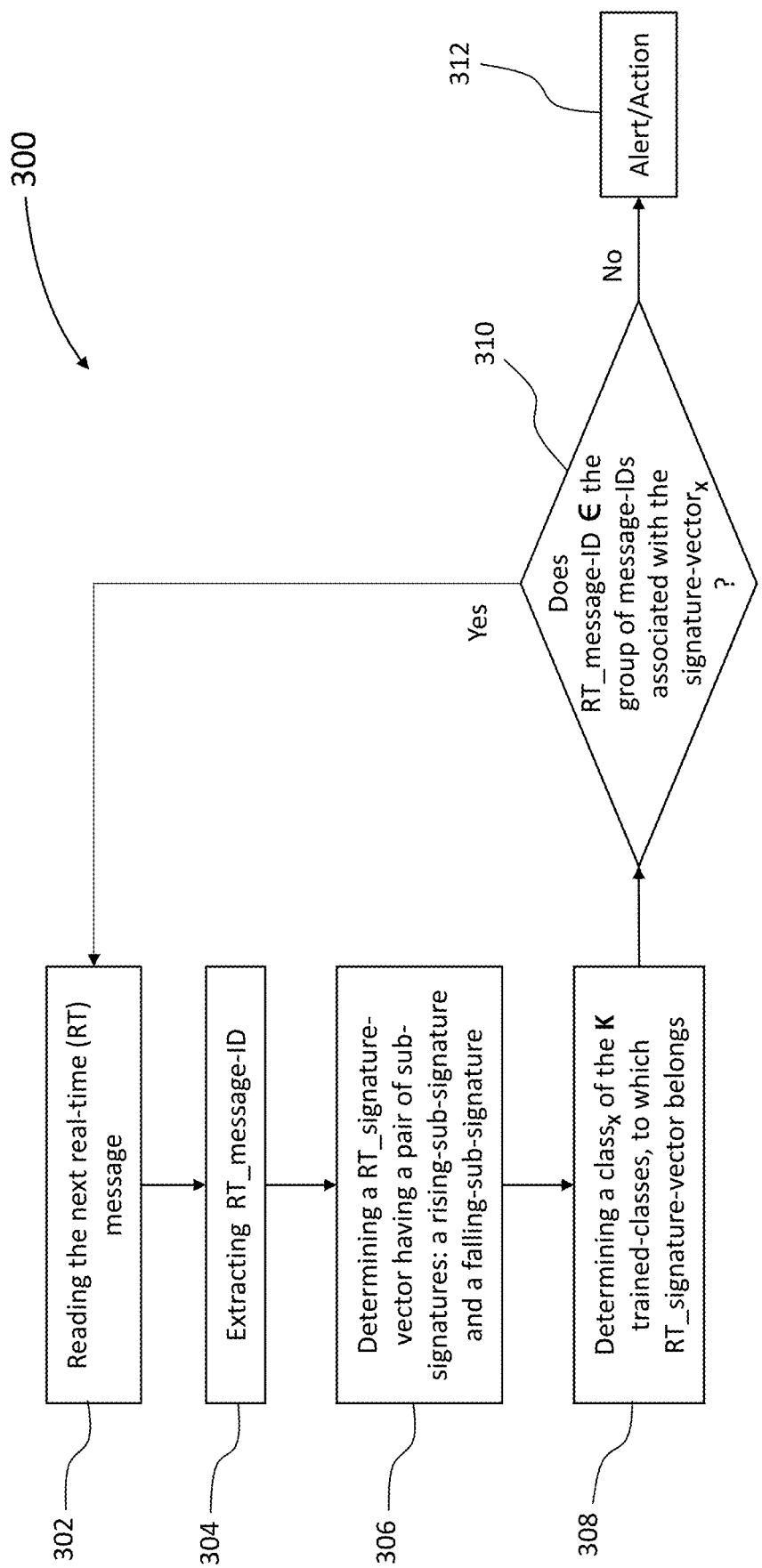
FIG. 5 illustrates in a flow diagram form a real-time stage, according to an embodiment of the present disclosure.

FIG. 5 illustrates the real-time stage 300 of the system of the present disclosure, in a flow-diagram form, wherein in real-time operation sub-system 100 is configured to validate the authenticity of message read on CAN-bus 113. Although an ECU 111 can, theoretically, be indirectly identified via the message ID, which message ID should be associated with a single ECU 111, this cannot be validated. Any error or non-authorized message appearing on CAN-bus 113, cannot be detected, addressed and fixed. The present invention provides the means and tools to do just that.

In step 302 of an unauthorized messages detection method 300, a message 20 on the CAN bus 113 is read and inspected in real-time. In step 304, the real-time (indicated by "RT") message-ID 23 is determined. The RT_message-ID 23 is in fact defined by several relatively early pulses of the message sequence of pulses 52. In step 306, based on RT_message-ID 23, a RT_signature-vector, having a pair of sub-signatures: a rising-sub-signature and a falling-sub-signature, is determined.

In step 308, unauthorized messages detection method 300 determines a $class_X$ of the K trained-classes, to which $RT\_signature\text{-}vector_X$ belongs. It should be noted that the classification process may use any common classification & prediction method such as, with no limitations, Support Vector Machine (SVM), Neural Network (NN) and Bagged Decision Tree (BDT).

In step 310, unauthorized messages detection method 300 checks if the RT_message-ID can be found in the group of message-IDs associated with the $signature\text{-}vector_X$. If procedure 300 determines that RT_message-ID cannot be found in the group of message-IDs associated with the $signature\text{-}vector_X$, an alert is issued in step 312, and/or any other preconfigured, appropriate action is taken to indicate that the message is improper and possibly malicious. Unauthorized messages detection method 300 then proceed with reading and inspecting the next real-time message. If procedure 300 determines that RT_message-ID is found in the group of message-IDs associated with the $signature\text{-}vector_X$, method 300 proceed with reading and inspecting the next real-time message.

It should be noted that the process 300 as described above can detect at least of the following unauthorized (malicious) manipulations:
  (a) Sending of a malicious message from an ECU a, while using, within the message sent, a disguised message-ID, pretending that the message was sent from an ECU b. Such a manipulation may occur when the malicious actor succeeds in gaining control of an ECU that is part of an existing CAN bus system (indicated in this case as ECU a). In this case, the real-time comparison will show a mismatch failure, as the real-time signature of ECU a (as determined from the real-time message) is different from the signature associated with ECU b (as found in the table, based on the message-ID);
  (b) Sending of a malicious message from a newly, invalidly installed ECU c, while indicating in the message a disguised message-ID pretending that it was sent from ECU b. Such a manipulation may occur when the malicious actor succeeds in installing the new ECU c on the CAN bus. Such a manipulation will change the physical configuration of CAN bus sub-system 100. Therefore, a real-time comparison will show a mismatch failure for some or all ECUs 111, of sub-system 100.

It should be noted that the procedures of FIGS. 4 (200) and 5 (300) are given herein for explanation only. The steps of the procedures, as well as their order may vary.

It should be further noted that the system 100 of the disclosure can easily issue an alert, in the case of a mismatch as described in items (a) and (b) above. In the case of a mismatch, the system of the disclosure may also manipulate the current message on the CAN bus in order to either: (c) cause the message to be invalid in view of introduction of six sequential "1" bits, or with six sequential "0" bits to within the message. These six sequential "1" bits, or six sequential "0" bits may be introduced to within the real-time message by the classifier 115, upon detection of the mismatch; or (d) cause the message-transmitting ECU to view a transmission error by causing it to see a sequence of "bit monitoring" errors, in a manner as described in PCT/IL2018/050858 (WO/2019/026077). Clearly, the taking of the actions as in (c) or (d) involve more real-time requirements, compared to the alternative of just issuing of an alert.

Figure 6A:
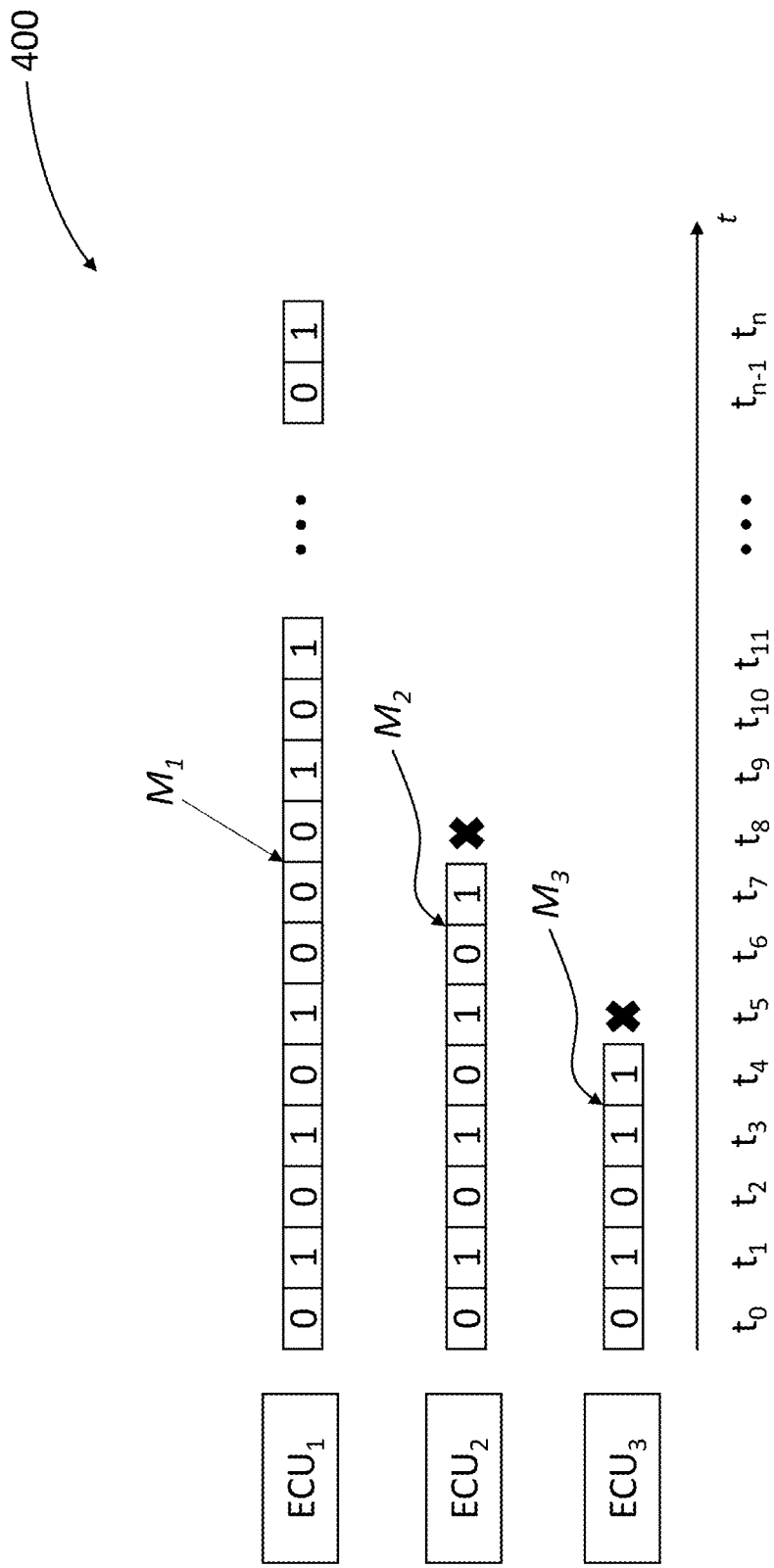
FIG. 6*a* is a schematic illustration of an example standard arbitration procedure executed in computerized sub-system.

FIG. 6a schematically illustrates, by way of example, a standard arbitration procedure executed in computerized sub-system 10, when two or more ECUs start transmitting a message simultaneously. The CAN specifications use the terms "dominant" bits and "recessive" bits where dominant is a logical 0, and recessive is a logical 1. The idle state is represented by the recessive level (Logical 1). If one ECU transmits a dominant bit and another ECU transmits a recessive bit, then there is a collision and the dominant bit "wins". Hence, when an ECU transmits a logical 1 but sees a logical 0, it realizes that there is a contention and it quits transmitting. By using this process, any ECU that transmits a logical 1 when another ECU transmits a logical 0 "drops out" or loses the arbitration.

Returning now to FIG. 6a, the example arbitration process 400 show 3 (three) ECUs: $ECU_1$, $ECU_2$, and $ECU_3$, simultaneously transmitting a respective message: $M_1$, $M_2$, and $M_3$. Arbitration process 400 proceeded as follows:
  In the first bit $t_0$ all three ECUs transmitted a logical 0, therefore all three ECUs continue transmitting their respective messages.
  In the second bit $t_1$ all three ECUs transmitted a logical 1, therefore all three ECUs continue transmitting their respective messages.
  In the third bit $t_2$ all three ECUs transmitted a logical 0, therefore all three ECUs continue transmitting their respective messages.
  In the fourth bit $t_3$ all three ECUs transmitted a logical 1, and therefore all three ECUs continue transmitting their respective messages.
  In the fifth bit $t_4$ $ECU_1$ transmitted a logical 0, $ECU_2$ also transmitted a logical 0 and $ECU_3$ transmitted a logical 1. Therefore, $ECU_3$ terminated the transmission of $M_3$.
  In the sixth bit $t_5$ the remaining two ECUs transmitted a logical 1, and therefore both ECUs continue transmitting their respective messages.
  In the seventh bit $t_6$ the remaining two ECUs transmitted a logical 0, and therefore both ECUs continue transmitting their respective messages.
  In the eighth bit $t_7$ $ECU_1$ transmitted a logical 0 and $ECU_2$ transmitted a logical 1. Therefore, $ECU_2$ terminated the transmission of $M_3$, leaving $ECU_1$ as a sole transmitter.

It should be appreciated that when two or more ECUs transmit, simultaneously, a respective message, the respective messages are overlaid, affecting the rising and falling of overlaid pulses and the impulse response of the overlaid pulses. Thereby the real times signatures of the overlaid pulses are affected such that classifier 115 cannot reliably find an appropriate class, $class_X$, in the K trained-classes. Therefore, in the example above, an appropriate $class_X$ can be found in the K trained-classes only in pulses commencing at or after bit $t_8$.

Following the above example and the well-defined arbitration procedure logic, the following addresses the integration of the arbitration procedure with a real-time stage procedure of identifying the signature associated with a transmitter ECU as described, for example, with relation to real-time stage method 500.

Figure 6B:
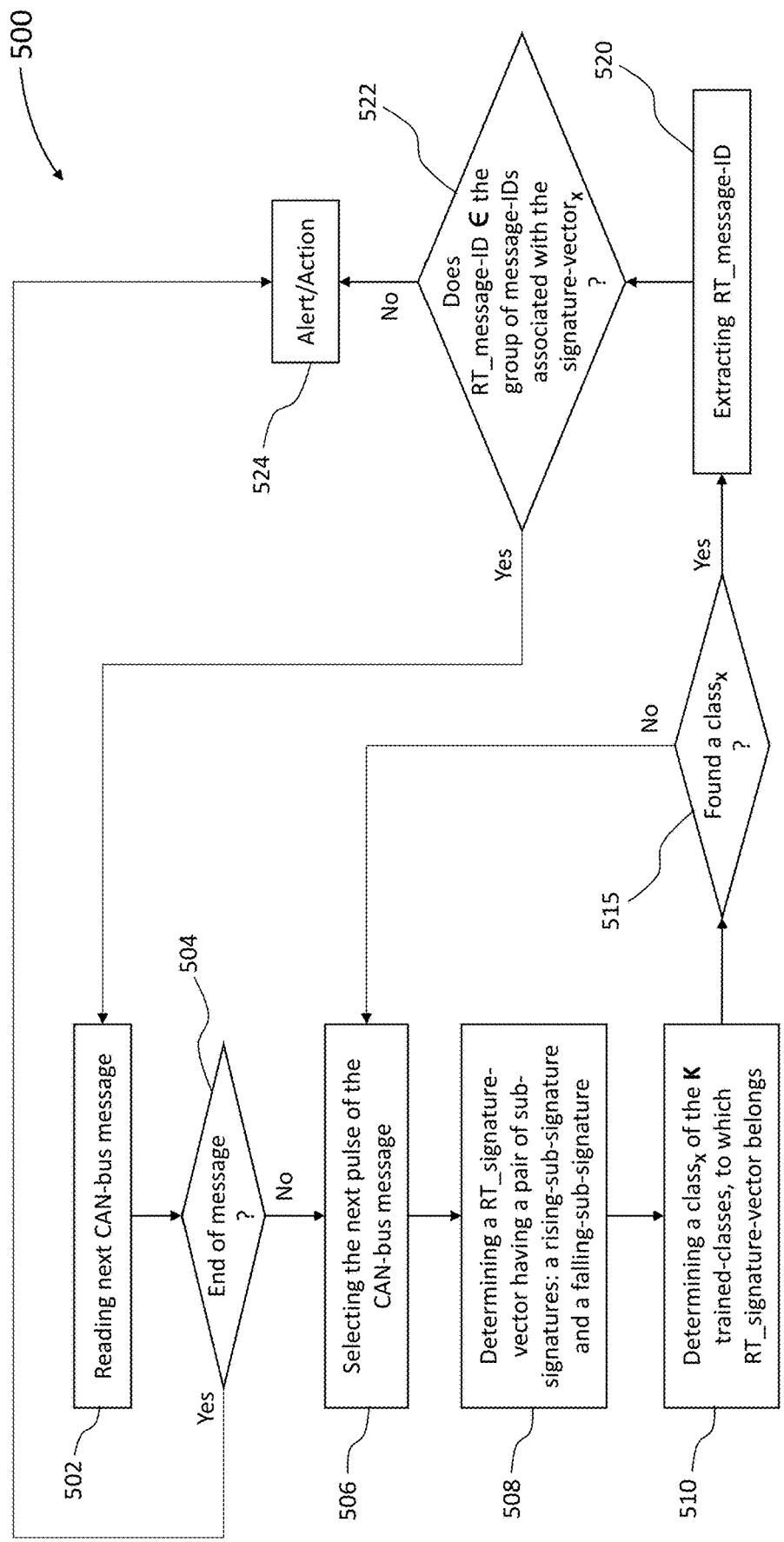
FIG. 6*b* illustrates in a flow diagram form a real-time stage of an example method for detecting unauthorized messages on a CAN bus system of a vehicle, according to an embodiment of the present disclosure, wherein arbitration noise exists on the CAN bus.

FIG. 6b illustrates the real-time stage method 500 (being also an unauthorized messages detection method 500) of the system of the present disclosure, in a flow-diagram form, wherein in real-time operation sub-system 100 is configured to validate the authenticity of message read on CAN-bus 113, while overcoming the noise created by the arbitration process, when occur.

In step 502 of an unauthorized messages detection method 500, a message 20 on the CAN bus 113 is read and inspected in real-time. In step 504, the classifier 115 determines if reached the end of the message. If reached the end of the message—an alert is issued in step 524, else proceed with next step (506). In step 506, the next pulse is selected. In step 508, based on one or more read pulses 52, a RT_signature-vector, having a pair of sub-signatures: a rising-sub-signature and a falling-sub-signature, is determined.

In step 510, unauthorized messages detection method 500 determines a $class_X$ of the K trained-classes, to which $RT\_signature\text{-}vector_X$ belongs. It should be noted that the classification process may use any common classification & prediction method such as, with no limitations, Support Vector Machine (SVM), Neural Network (NN) and Bagged Decision Tree (BDT).

In step 515, unauthorized messages detection method 500 checks if a $class_X$ has been found in the group of message-IDs associated with the signature-$vector_X$. If a $class_X$ has not been found in the group of message-IDs associated with the signature-$vector_X$, go back to step 504 select the next pulse. If a $class_X$ has been found in the group of message-IDs associated with the signature-$vector_X$, proceed with next step (520). In step 520, the real-message-ID 23 of the read message 20 is determined.

In step 522, unauthorized messages detection method 500 checks if the RT_message-ID can be found in the group of message-IDs associated with the signature-$vector_X$. if the RT_message-ID can be found in the group of message-IDs associated with the signature-$vector_X$, go to step 502 and read the next message.

If procedure 500 determines that RT_message-ID cannot be found in the group of message-IDs associated with the signature-$vector_X$, an alert is issued in step 524, and/or any other preconfigured, appropriate action is taken to indicate that the message is improper and possibly malicious. Unauthorized messages detection method 500 then proceed with reading and inspecting the next real-time message. If procedure 500 determines that RT_message-ID is found in the group of message-IDs associated with the signature-$vector_X$, method 500 proceed with reading and inspecting the next real-time message.

While some of the embodiments of the disclosure have been described by way of illustration, it will be apparent that the disclosure can be carried into practice with many modifications, variations and adaptations, and with the use of numerous equivalents or alternative solutions that are within the scope of a person skilled in the art, without departing from the spirit of the invention, or the scope of the claims.

What is claimed is:

1. A method for creating an ECU-signature for an Electronic Control Unit (ECU), the ECU being integrally operating within a Controller Area Network (CAN)-bus sub-system of a vehicle, the CAN-bus sub-system having at least two ECUs, the method comprising the steps of:
   a) reading and storing into a memory storage a plurality of CAN-bus messages, wherein each of said CAN-bus messages is generated by a message generating ECU of said at least two ECUs;
   b) based on a non-linearity of the CAN bus sub-system, determining from at least one pulse of each of said read messages a training-signature, wherein each of said training-signatures comprises a pair of sub-signatures:
      i) a rising-sub-signature of a rising response, being an impulse response of a rising section of said at least one pulse of the CAN-bus sub-system, as viewed by said message generating ECU; and
      ii) a falling-sub-signature of a falling response, being an impulse response of a falling section of said at least one pulse of the CAN-bus sub-system, as viewed by said message generating ECU; and
   c) for each of said message generating ECUs, determine a unique ECU-signature from said respective training-signatures.

2. The ECU-signature creating method of claim 1, wherein said creating of an ECU-signature is performed for all ECUs operating in the CAN-bus sub-system of the vehicle, and wherein said method further comprises the steps of:
   d) extracting from each of said read CAN-bus messages a respective training message-ID;
   e) associating each of said training message-ID with a respective training signature that correspond to a mutual read message;
   f) recording each of associated pair of the training signature and theft training message-ID; and
   g) classifying all of said pairs of said respective training message-IDs and training signatures, yielding a number K of trained-classes, each of said trained-class having a unique signature-vector, wherein each of said trained-classes represents an ECU of said at least two ECUs, and said unique signature-vector is the ECU-signature of that ECU.

3. The ECU-signature creating method of claim 2, further comprising the steps of:
   h) recording triplets of ECU-features, each comprising a training signature, a training message-ID and respective ECU-ID, in a non-volatile memory storage.

4. The ECU-signature creating method of claim 1, wherein said read messages are stored in a temporary memory storage.

5. The ECU-signature creating method of claim 1, wherein the CAN-bus sub-system is replaced by a vehicle bus sub-system selected from the group including Can-FD, Flexray, and Automotive Ethernet Standards.

6. A system for creating a unique ECU-signature for an ECU, the ECU being integrally operating within a Controller Area Network (CAN)-bus sub-system of a vehicle, the CAN-bus sub-system having at least two ECUs, the system comprises a classifier comprising:
   a) a controller;
   b) a listening-sensor; and
   c) a temporary memory storage, wherein, during a training stage, said classifier is configured to:
   a) by said listening-sensor, read from the CAN-bus sub-system a plurality of CAN-bus messages, wherein each of said CAN-bus message is generated by a message generating ECU of said at least two ECUs, and store said read CAN-bus messages in said temporary memory storage;
   b) based on a non-linearity of the CAN bus sub-system, determining from at least one pulse of each of said read message a training-signature, wherein each of said training-signatures comprises a pair of sub-signatures:
  i) a rising-sub-signature of a rising response, being an impulse response of a rising section of said at least one pulse of the CAN-bus sub-system, as viewed by said message generating ECU; and
  ii) a falling-sub-signature of a falling response, being an impulse response of a falling section of said at least one pulse of the CAN-bus sub-system, as viewed by said message generating ECU; and
c) for each of said message generating ECUs, determine by said controller a unique ECU-signature from said respective training-signatures.

7. The ECU-signature creating system of claim 6, wherein, during the training stage, said classifier is further configured to:
  d) extract from each of said read CAN-bus messages a respective training message-ID;
  e) associate each of said training message-ID with a respective training signature that correspond to a mutual read message;
  f) store ECU-IDs in a non-volatile memory storage, wherein said stored ECU-ID is associated with a single ECU-signature and with one or more message-IDs; and
  g) classify all of said pairs of said respective training message-IDs and training signatures, yielding a number K of trained-classes, each of said trained-class having a unique signature-vector, wherein each of said trained-classes represents an ECU of said at least two ECUs, and said unique signature-vector is the ECU-signature of that ECU.

8. The ECU-signature creating system of claim 7, wherein during the training stage, said classifier is further configured to:
  h) store triplets of ECU-features, each comprising a training signature, a training message-ID and respective ECU-ID, in a non-volatile memory storage.

9. The ECU-signature creating system of claim 6, wherein said classifier is an ECU.

10. The ECU-signature creating system of claim 6, wherein the CAN-bus sub-system is replaced by a vehicle bus system selected from the group including Can-FD, Flexray, and Automotive Ethernet Standards.

11. A method for detecting unauthorized messages on a Controller Area Network (CAN)bus sub-system of a vehicle, comprising:
during a training stage:
  a) creating of an ECU-signature for all ECUs operating in the CAN-bus sub-system of the vehicle; and
during realtme operation:
  b) reading a CAN-bus message generated by an unknown ECU;
  c) extracting from said read CAN-bus message a real-time message-ID;
  d) based on a non-linearity of the CAN bus, determining from at least one pulse of said read CAN-bus message a real-time-signature, wherein said real-time-signature comprises a pair of sub-signatures:
    i) a rising-sub-signature of a rising response, being an impulse response of a rising section of said at least one pulse of the CAN-bus sub-system, as viewed by said message generating ECU; and
    ii) a falling-sub-signature of a falling response, being an impulse response of a falling section of said at least one pulse of the CAN-bus sub-system, as viewed by said message generating ECU;
  e) determining a specific $class_x$ from a group containing K trained-classes, to which said real-time-signature belongs;
  f) identifying an $ECU_x$ associated with $class_x$;
  g) if no $class_x$ is found, then it is determined that an unauthorized message was sent from an ECU that was installed without authorization;
  h) extracting one or more training message-IDs associated with $ECU_x$;
  i) comparing said real-time message-ID with any one of said extracted training message-IDs;
  j) if a match is detected, go back to step (b) for reading a next message; and
  k) if no match is found, then:
    i) it is concluded that an unauthorized actor took control of an ECU;
    ii) taking a preconfigured appropriate action; and
    iii) go back to step (b) for reading a next message.

12. The method for detecting unauthorized messages of claim 11, wherein said taking an appropriate action comprises issuing an alert for an unauthorized message.

13. The method for detecting unauthorized messages of claim 12, wherein said unauthorized message is a malicious message.

14. The method for detecting unauthorized messages of claim 11, wherein the CAN-bus sub-system is replaced by a vehicle bus system selected from the group including Can-FD, Flexray, and Automotive Ethernet Standards.

15. A system for detecting unauthorized messages on a Controller Area Network (CAN)-bus sub-system of a vehicle, the CAN-bus sub-system having at least two ECUs, the system comprises a classifier comprising
  a) a controller;
  b) a listening-sensor; and
  c) a temporary memory storage;
  wherein, during a training stage, said classifier is configured to:
  a) create of an ECU signature for all ECUs operating in the CAN-bus sub-system of the vehicle; and
during real-time operation, said classifier is configured to:
  b) read a CAN-bus message generated by an unknown ECU;
  c) extract from said read CAN-bus message a real-time message-ID;
  d) based on a non-linearity of the CAN-bus sub-system, determine from at least one pulse of said read CAN-bus message a real-time-signature, wherein said real-time-signature comprises a pair of sub-signatures:
    i) a rising-sub-signature of a rising response, being an impulse response of a rising section of said at least one pulse of the CAN-bus sub-system, as viewed by said message generating ECU; and
    ii) a falling-sub-signature of a falling response, being an impulse response of a falling section of said at least one pulse of the CAN-bus sub-system, as viewed by said message generating ECU;
  e) determine a specific $class_x$, from a group containing K trained-classes, to which said real-time-signature belongs;
  f) identify an $ECU_x$ associated with $class_x$;
  g) extract one or more training message-IDs associated with $ECU_x$;
  h) compare said real-time message-ID with any one of said extracted training message-IDs;
  i) if a match is found, go back to step (b) for a next message; and
  j) if no match is found, then:

i) conclude that said read CAN-bus message an unauthorized message;
ii) take a preconfigured appropriate action; and iii) go back to step (b) for a next message.

16. The system for detecting unauthorized messages of claim 15, wherein said classifier is an ECU.

17. The system for detecting unauthorized messages of claim 15, wherein said unauthorized message is a malicious message.

18. The system for detecting unauthorized messages of claim 15, wherein if no $class_x$ is found, it is determined that an unauthorized message was sent from an ECU that was installed without authorization.

19. The system for detecting unauthorized messages of claim 15, wherein if no match found when comparing said real-time message-ID with any one of said extracted training message-IDs, it is concluded that an unauthorized actor took control of an ECU.

20. The system for detecting unauthorized messages of claim 15, wherein the CAN-bus sub-system is replaced by a vehicle bus system selected from the group including Can-FD, Flexray, and Automotive Ethernet Standard.

21. A method for detecting unauthorized messages on a Controller Area Network (CAN)-bus sub-system of a vehicle, wherein arbitration noise exists on the CAN bus, the method comprising: during a training stage:
  a) creating of an ECU-signature for all ECUs operating in the CAN-bus sub-system of the vehicle; and during real-time operation:
  b) reading a CAN-bus message generated by an unknown ECU;
  c) if reached an end of the message, then:
    i) it is concluded that an unauthorized actor took control of an ECU;
    ii) taking a preconfigured appropriate action; and
    iii) return to step (b) for a next message;
  d) selecting a next pulse of said read CAN-bus message;
  e) based on a non-linearity of the CAN-bus sub-system, determining from said selected pulse of said read CAN-bus message a real-time-signature, wherein said real-time-signature comprises a pair of sub-signatures:
    i) a rising-sub-signature of a rising response, being an impulse response of a rising section of said at least one pulse of the CAN-bus sub-system, as viewed by said message generating ECU; and
    ii) a failing-sub-signature of a falling response, being an impulse response of a falling section of said at least one pulse of the CAN-bus sub-system, as viewed by said message generating ECU;
  f) determining a specific $class_x$ from a group containing K trained-classes, to which said real-time-signature belongs;
  g) if no $class_x$ is found, then go back to step (d) to select the next pulse; h) extracting from said read CAN-bus message a real-time message-ID;
  i) identifying an ECU associated with $class_x$;
  j) extracting one or more training message-IDs associated with $ECU_x$;
  k) comparing said real-time message-ID with any one of said extracted training message-IDs;
  l) if a match is detected, go back to step (b) for reading a next message; and
  m) if no match is found, then:
    i) it is concluded that an unauthorized actor took control of an ECU;
    ii) taking a preconfigured appropriate action; and
    iii) go back to step (b) for reading a next message.

22. The method for detecting unauthorized messages of claim 21, wherein said taking an appropriate action comprises issuing an alert for an unauthorized message.

23. The method for detecting unauthorized messages of claim 22, wherein said unauthorized message is a malicious message.

24. The method for detecting unauthorized messages of claim 21, wherein the CAN-bus sub-system is replaced by a vehicle bus system selected from the group including Can-FD, Flexray, and Automotive Ethernet Standards.

25. A system for detecting unauthorized messages on a Controller Area Network (CAN)-bus sub-system of a vehicle, the CAN-bus sub-system having at least two ECUs, the system comprises a classifier comprising:
  a) a controller;
  b) a listening-sensor; and
  c) a temporary memory storage;
  wherein, during a training stage, said classifier is configured to:
  a) create of an ECU-signature for all ECUs operating in the CAN-bus sub-system of the vehicle; and during real-time operation, said classifier is configured to:
  b) read a CAN-bus message generated by an unknown ECU;
  c) if reached an end of the message, then:
    i) it is concluded that an unauthorized actor took control of an ECU;
    ii) take a preconfigured appropriate action; and
    iii) return to step (b) for a next message;
  d) select a next pulse of said read CAN-bus message
  e) based on a non-linearity of the CAN-bus sub-system, determine from at least one pulse of said read CAN-bus message a real-time-signature, wherein said real-time-signature comprises a pair of sub-signatures:
    i) a rising-sub-signature of a rising response, being an impulse response of a rising section of said at least one pulse of the CAN-bus sub-system, as viewed by said message generating ECU; and
    ii) a failing-sub-signature of a falling response, being an impulse response of a falling section of said at least one pulse of the CAN-bus sub-system, as viewed by said message generating ECU;
  f) determine a specific $class_x$, from a group containing K trained-classes, to which said real-time-signature belongs;
  g) if no $class_x$ is found, then go back to step (d) to select the next pulse;
  h) extract from said read CAN-bus message a real-time message-ID;
  i) identify an $ECU_x$ associated with $class_x$;
  j) extract one or more training message-IDs associated with $ECU_x$;
  k) compare said real-time message-ID with any one of said extracted training message-IDs;
  l) if a match is found, go back to step (b) for a next message; and
  m) if no match is found, then:
    i) conclude that said read CAN-bus message is an unauthorized message;
    ii) take a preconfigured appropriate action; and
    iii) go back to step (b) for a next message.

26. The system for detecting unauthorized messages of claim 25, wherein said classifier is an ECU.

27. The system for detecting unauthorized messages of claim 25, wherein said unauthorized message is a malicious message.

28. The system for detecting unauthorized messages of claim 25, wherein if no $class_x$ is found, it is determined that an unauthorized message was sent from an ECU that was installed without authorization.

29. The system for detecting unauthorized messages of claim 25, wherein if no match found when comparing said real-time message-ID with any one of said extracted training message-IDs, it is concluded that an unauthorized actor took control of an ECU.

30. The system for detecting unauthorized messages of claim 25, wherein the CAN-bus sub-system is replaced by a vehicle bus system selected from the group including Can-FD, Flexray, and Automotive Ethernet Standard.

* * * * *